United States Patent

[11] 3,585,479

[72] Inventors Thomas A. Zickel;
Jackson R. Templin, both of Anderson, Ind.
[21] Appl. No. 820,588
[22] Filed Apr. 30, 1969
[45] Patented June 15, 1971
[73] Assignee General Motors Corporation
Detroit, Mich.

[54] MOTOR SPEED CONTROL DEPENDENT ON SPEED FEEDBACK AND A VACUUM
6 Claims, 3 Drawing Figs.
[52] U.S. Cl.................................................. 318/346,
318/335
[51] Int. Cl........................................................ H02p 5/10
[50] Field of Search........................................... 318/335,
330, 346, 349; 290/c.v.

[56] References Cited
UNITED STATES PATENTS
2,569,166  9/1951  Harstick........................ 318/335
2,913,589 11/1959  Bell.............................. 290/C-V

*Primary Examiner*—Oris L. Rader
*Assistant Examiner*—Thomas Langer
*Attorneys*—F. J. Soucek and C. R. Engle ABSTRACT: In a motor vehicle, a vacuum motor is employed to vary the electrical resistance that is connected in circuit with an air blower motor so that the volume of cold or warm air supplied to the passenger compartment of the vehicle is automatically modified to maintain the temperature of the air within the vehicle at a desired value.

PATENTED JUN 15 1971

3,585,479

INVENTORS
Thomas R. Zickel &
BY Jackson R. Templin

F.J. Soucek
ATTORNEY

MOTOR SPEED CONTROL DEPENDENT ON SPEED FEEDBACK AND A VACUUM

The present invention generally relates to the control of the air temperature within a motor vehicle passenger compartment, and more specifically relates to the control of the air temperature by automatically varying the speed of the blower motor.

Air blower motors of most automobiles are series, direct current DC motors. These blower motors are generally of constant speed, or manually adjustable for high or low speeds. In conjunction with blower motors, it has been a practice to employ airflow devices, such as a vent, to control the flow or volume of heated or cooled air that flows into the vehicle compartment. The use of a vent device has been somewhat effective in that the opening of the vent, and accordingly the volume of ambient air that is mixed with heated or cooled air, can be adjusted in accordance with vehicle compartment temperature. This vent may be controlled by a vacuum actuator which in turn is responsive to a vacuum thermostat positioned in the car interior.

A thermostatic control unit for controlling the vacuum supply to the vacuum actuator may be of the type disclosed in the U.S. application of Jackson R. Templin, et al., Ser. No. 663,071, filed Aug. 24, 1967 now U.S. Pat. No. 3,460,754 and assigned to the assignee of the present application desirable to reduce the blower motor speed in order to force less air into the passenger compartment.

By employing a vacuum motor to automatically adjust the speed of the blower motor over a range between a given high and low speed a passenger compartment can be heated or cooled in a relatively short time and in addition maintenance of the temperature within the compartment at a relatively constant value is enhanced.

Another advantage of employing an automatically adjustable motor is this: A constant speed motor has a given noise level that may be higher than necessary for the work it is required to do. By employing variable speed motor, the noise level will vary and, therefore passenger comfort is improved at those times when noise level would otherwise be excessive.

It is, therefore, one object of the present invention to provide means for automatically controlling the speed of the blower motor of a vehicle, which motor forces warm or cold air into the passenger compartment of the vehicle.

A further object of the present invention is to decrease the time required to heat or cool the passenger compartment of a motor vehicle by automatically controlling the speed of the vehicle blower motor.

An additional object of the present invention is to add to the comfort of the occupant of a vehicle by reducing the noise level produced by the blower motor.

In accordance with the present invention, means are provided to vary the magnitude of electric current flowing through the armature of a DC blower motor in order to vary the speed of the blower and, accordingly, vary the flow of warm or cold air into the passenger compartment of a motor vehicle.

In a preferred embodiment of the present invention, an electrical resistor in series with the armature of the blower motor is periodically shorted out or bypassed so that the current flowing through the armature is either at a maximum or a minimum value depending upon whether the resistor is shorted out or is not shorted out. The average current flowing through the armature is dependent upon the time period that the resistor is shorted out. The average current increases until the condition exists when the resistor is shorted out without periodically reopening. The time period during which the resistor is shorted is controlled by a vacuum motor that is responsive to vacuum having a value controllable by a vacuum thermostat positioned in the passenger compartment and of a type disclosed in the above-mentioned Templin et al. application.

The present invention and further objects will become readily apparent from the following description when read in connection with the accompanying drawing wherein.

Figure 1:
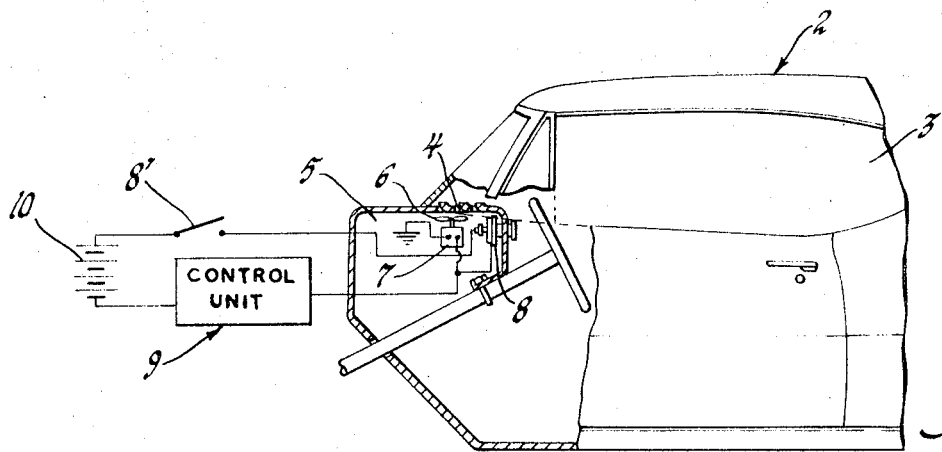
FIG. 1 is a diagrammatic view, partly in section of a motor vehicle incorporating a blower-motor-driven fan, which blower motor is controlled in accordance with the present invention.

Referring now to FIG. 1, a motor vehicle 2 includes a passenger compartment 3 having dashboard louvers 4 through which air flows. A chamber or air duct means 5 receives air from outside of the vehicle through vents (not shown) and this air may be heated or cooled by suitable means before it is forced into the passenger compartment by a fan 6. A direct current DC motor 7 drives the fan 6.

In accordance with the present invention, a variable resistor 8 and a control unit 9 are connected in circuit with the motor 7 and a source of DC voltage 10. An on-off switch 8' is connected in series with the source 10 and may be manually controlled in conjunction with the resistor 8. The electrical circuit of FIG. 1 is shown for illustrative purposes only. Details of the circuit and of the control unit 9 are shown in FIGS. 2 and 3.

Figure 2:
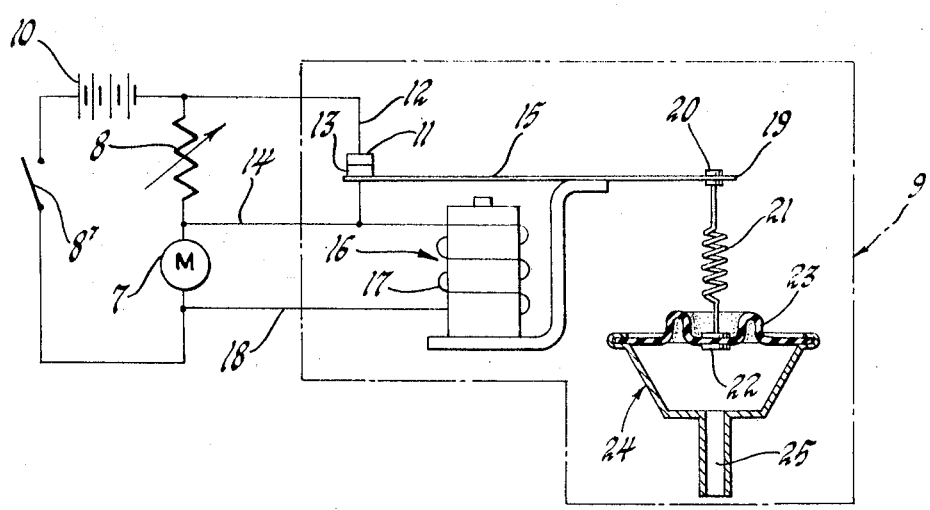
FIG. 2 is a schematic diagram of the control unit of FIG. 1 showing one embodiment of the present invention.
Figure 3:
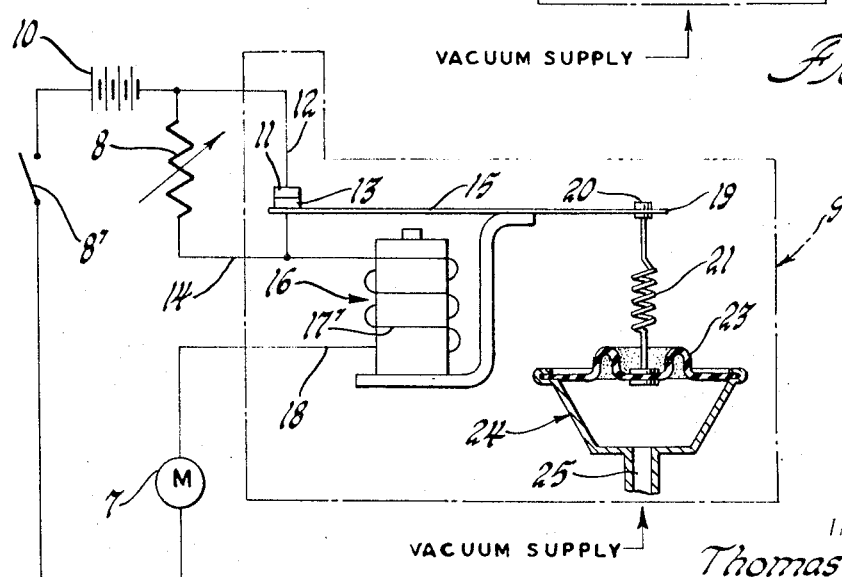
FIG. 3 is a schematic diagram of the control unit of FIG. 1 showing a second embodiment of the present invention.

Referring now to FIG. 2, the motor 7, resistor 8, and DC voltage source 10 are electrically connected in series. The control unit 9 includes a fixed contact 11 that is connected through conductor 12 to one side of the resistor 8, and further includes a movable contact 13 connected through conductor 14 to the other side of resistor 8. The movable contact 13 is carried by an armature 15 of an electromagnet 16. The electromagnet 16 has an actuating coil 17 that is electrically connected in parallel with the armature of motor 7 through conductors 14 and 18.

The armature 15 of electromagnet 16 has an end portion 19 that extend beyond one side of the electromagnet. The end portion 19 is secured by a rivet or other means 20 to one end of a spring 21. The other end of spring 21 is secured by a rivet 22 to a flexible diaphragm 23 of a vacuum motor 24. Vacuum is supplied to vacuum motor 24 through a passage 25. The vacuum supply is preferably the intake manifold (not shown) of motor vehicle 2, and this supply is modified in accordance with compartment temperature as more fully explained in the Templin et al. application Ser. No. 663,071 now U.S. Pat. No. 3,460,754 and incorporated herein by reference.

The control unit of FIG. 2 operates as follows: assuming that vehicle 2 has not been started, no vacuum is supplied to vacuum motor 24 from the intake manifold of the vehicle engine and contacts 11 and 13 which are normally closed, short out resistor 8. Upon starting the vehicle, vacuum is supplied to the vacuum motor 24, and the tension of spring 21 is increased to tend to maintain closure of contacts 11 and 13.

If it is desired to heat or cool the passenger compartment 3, switch 8' is closed and electric current is caused to flow through resistor 8 and motor 7. If the resistance of the variable resistor is maintained at a low value the speed of motor 7 will be high, and the passenger compartment will be rapidly cooled or heated even through contacts 11 and 13 are vibrating as described below.

Under normal operating conditions the resistance of resistor 8 will be set at a high value and maintained there. Since contacts 11, 13 are closed to short out resistor 8 the blower motor 7 will continue to run at a high speed, and there will be a large voltage drop across the armature of motor 7. This voltage is applied to coil 17 through conductors 14 and 18, and the electromagnet 16 is energized. Energization of electromagnet 16 attracts the armature 15 causing contacts 11, 13 to open. Opening of the contacts will place resistor 8 in circuit with motor 7 and cause the speed of motor 7 to decrease. Placing resistor 8 in series with motor 7 will also cause a decrease in the voltage drop across the armature of motor 7. This in turn causes deenergization of the electromagnet 16 and closure of contacts 11, 13. This process is then repeated resulting in the periodic opening and closing of contacts 11, 13. These vibrating contacts therefore control the speed of blower motor 7.

In the above system, the resistor 8 is alternately shorted out then unshorted with the average time in the shorted condition being a measure of the average current passing through motor 7. With the resistor shorted a small portion of the time, the average current is very nearly equal to the current determined by series resistor 8 and the motor 7. As the portion of time the resistor 8 is shorted is increased, the average current to motor 7 increases until the condition exists such that the resistor 8 is shorted out 100 percent of the time. Under this condition, the motor runs at its maximum speed.

Referring now to FIG. 3, the motor 7, resistor 8, DC voltage source 10, and switch 8' are again electrically connected in series. In this embodiment, coil 17' of the electromagnet 16 is also connected in series with blower motor 7 rather than in parallel with the motor as shown in FIG. 2. The coil 17' is current responsive rather than voltage responsive. With contacts 11, 13 closed, more current passes through coil 17' to energize the electromagnet 16 and thereby open contacts 11 and 13.

The operation of the control unit 9, as shown in FIG. 3, is otherwise the same as that of FIG. 2 which operation is clearly described above.

In summary, the blower motor 7 of the subject invention can be controlled to rapidly cool or heat the passenger compartment of a motor vehicle and, in accordance with the present invention, the speed of the blower motor is automatically adjusted to vary in proportion to the variation of temperature from a desired value within the passenger compartment.

What We claim is:

1. In a circuit for a variable speed electric motor, which circuit includes a source of voltage and a resistor in series with said motor, the improvement comprising a vacuum-operated control unit for automatically varying the speed of said motor, said control unit including a first contact connected to one end of said resistor, a second contact connected to the other end of said resistor, means for vibrating said contacts including an electromagnet having a movable armature, means securing one of said contacts to said armature, an electric coil may be energized to energize said electromagnet and vibrate said one of said contacts, means for controlling the duration of time said contacts are opened and closed, said last means including a vacuum motor having a flexible diaphragm, and means connecting said diaphragm to said armature whereby upon application of vacuum to said vacuum motor said diaphragm urges said armature in a direction to maintain said contacts closed.

2. In a circuit for a variable speed electric motor as defined in claim 1, said coil on said electromagnet being connected in parallel with said variable speed motor.

3. In a circuit for a variable speed electric motor as defined by claim 1, said coil on said electromagnet being connected in series with said variable speed motor.

4. In a motor vehicle having a passenger compartment therein that is heated or cooled by the flow of air through said compartment, the improvement comprising duct means for directing air into said compartment, a blower positioned within said duct means to force air therethrough, a variable speed electric motor coupled to said blower, a source of voltage, a resistor electrically connected in series with said source of voltage and said motor, a control unit for automatically varying the speed of said motor, said control unit including a pair of electrical contacts, means connecting said contacts in parallel with said resistor whereby said resistor is shorted when said contacts are closed, means for vibrating said contacts, and means for controlling the duration of time contacts are opened and closed.

5. The combination as defined by claim 4 wherein said means for controlling the duration of time said contacts are opened and closed includes a vacuum motor having a flexible diaphragm that is mechanically connected to one of said contacts.

6. In a circuit for a variable speed electric motor, which circuit includes a source of voltage and a resistor in series with said motor, the improvement comprising a control unit for automatically varying the speed of said motor, said control unit including an electromagnet having a coil connected in said circuit, an armature mounted adjacent said electromagnet and actuated thereby, first and second electric contacts, one of said contacts being fixed and the other of said contacts being secured to one end of said armature and vibrating therewith, means for connecting said contacts in parallel with said resistor whereby said resistor is shorted when said contacts are closed, means for controlling the duration of time said contacts are opened and closed, said last means including a vacuum motor having a flexible diaphragm, a spring element connecting said diaphragm to said armature, and means connecting said vacuum motor to a vacuum supply.